June 13, 1939.  A. S. T. LAGAARD  2,162,558
CONTROL DEVICE FOR DOUGHNUT MACHINES
Filed June 27, 1938  3 Sheets-Sheet 1
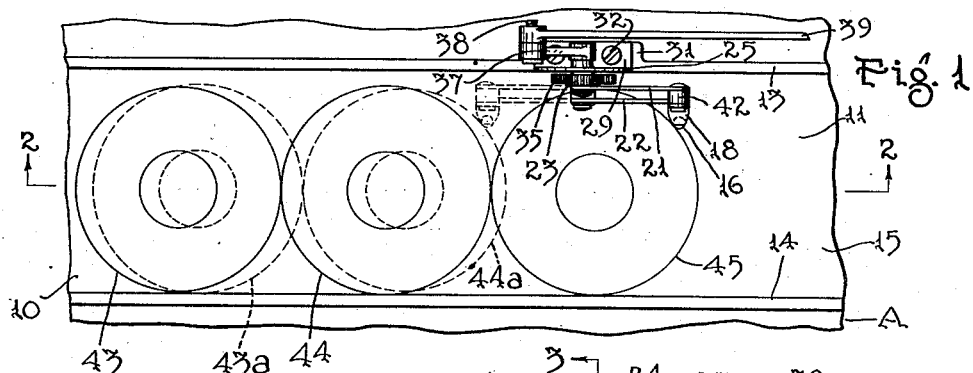
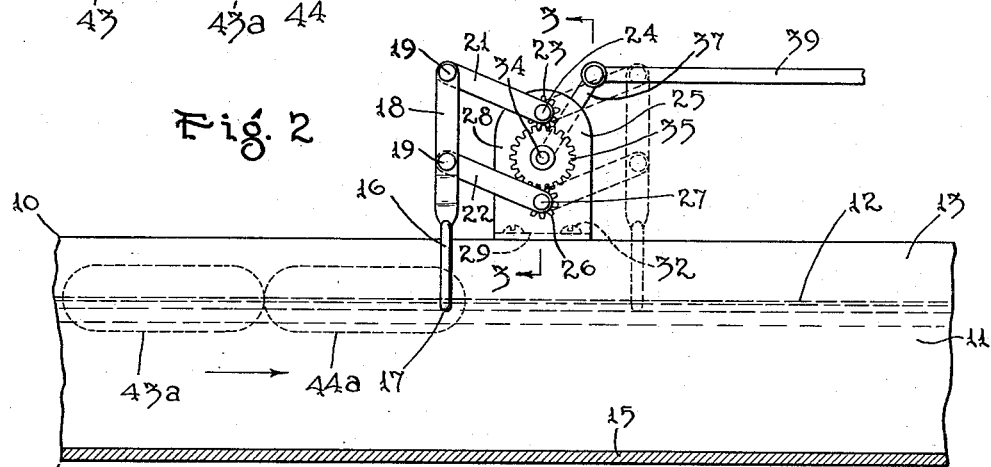
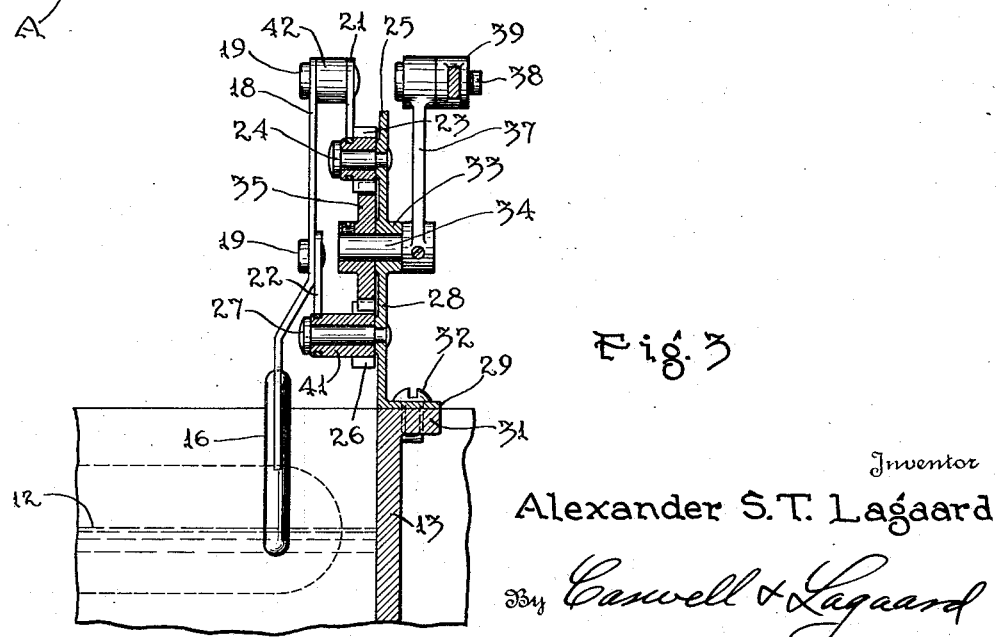
Inventor
Alexander S. T. Lagaard
By Caswell & Lagaard
Attorneys

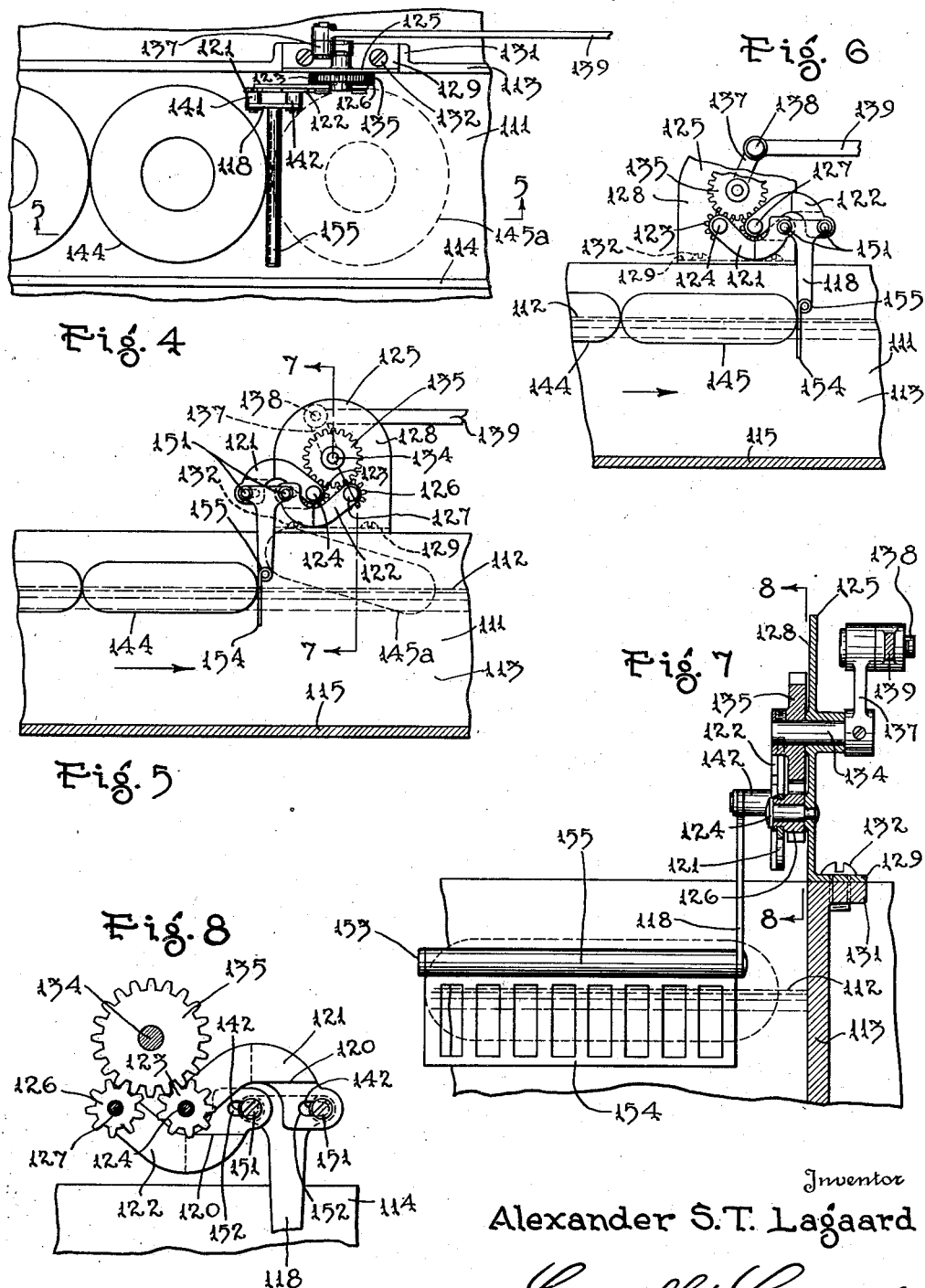

June 13, 1939.  A. S. T. LAGAARD  2,162,558
CONTROL DEVICE FOR DOUGHNUT MACHINES
Filed June 27, 1938  3 Sheets-Sheet 3
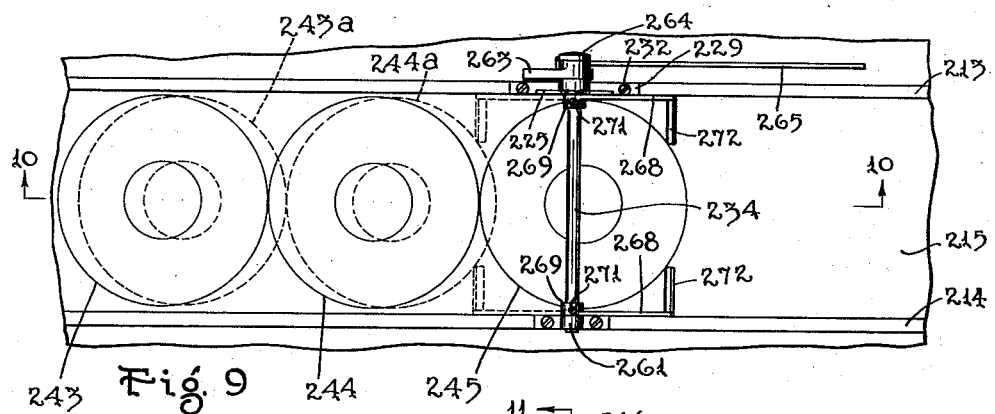
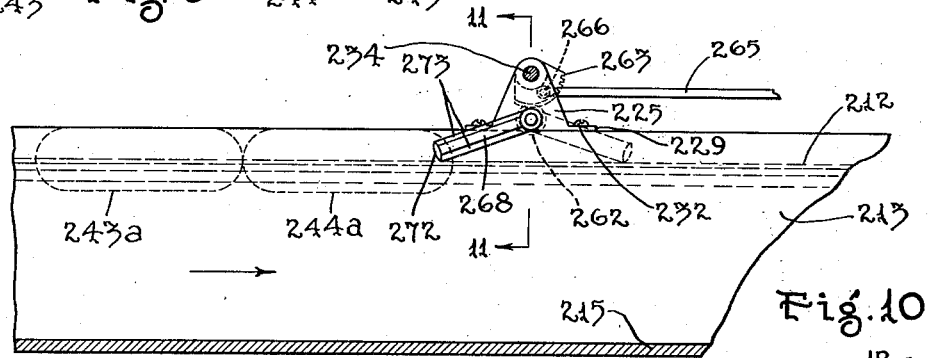
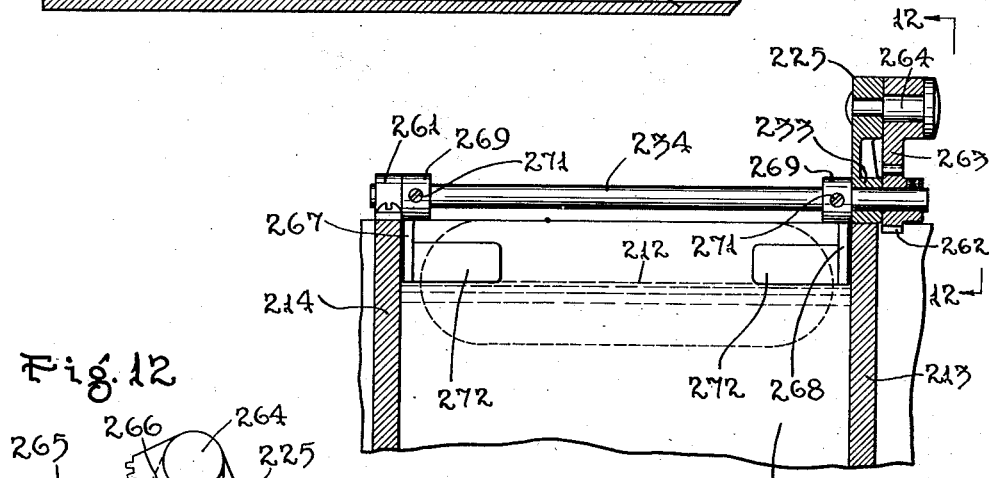
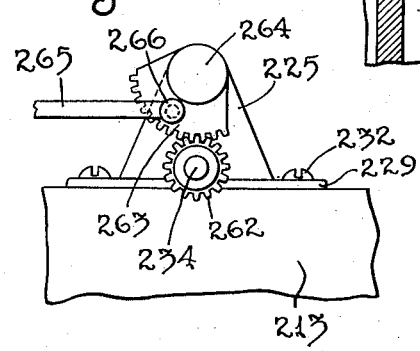
Inventor
Alexander S.T. Lagaard
By Caswell & Lagaard
Attorneys Patented June 13, 1939

2,162,558

UNITED STATES PATENT OFFICE 2,162,558

CONTROL DEVICE FOR DOUGHNUT MACHINES

Alexander S. T. Lagaard, Minneapolis, Minn., assignor to Dough-King, Inc., Minneapolis, Minn., a corporation of Minnesota Application June 27, 1938, Serial No. 216,025

9 Claims. (Cl. 53—7)

My invention relates to control devices for doughnut machines and particularly to devices for controlling the travel of doughnuts to a doughnut turner or ejector of the continuous type such as disclosed in the application for patent of Peter J. Toews, Serial Number 114,395, filed Dec. 6, 1936.

An object of the invention resides in providing a device by means of which the travel of doughnuts is positively and effectively controlled.

Another object of the invention resides in providing a device which will not injure the doughnuts.

A still further object of the invention resides in providing a device which will not cause jamming of the doughnuts.

Another object of the invention resides in providing a control device which will operate with deformed or irregular shaped doughnuts.

An object of the invention resides in providing a control device having an engaging member which is alternately moved from one to the other of two positions in the course of travel of the doughnuts whereby the doughnuts are first arrested at one position and then arrested at another position.

Another object of the invention resides in providing a device in which the engaging member is moved from the one position to the other in a short enough time so that control of the doughnuts is still maintained.

An object of the invention resides in providing a device in which the engaging member operates between the doughnuts so as to prevent injury thereto.

Another object of the invention resides in arranging the engaging member so that the same may travel principally beneath the cooking liquid and engage the doughnuts from beneath.

Another object of the invention resides in providing a control device which may be readily operated by means of a longitudinally reciprocable link or rod.

Other objects of the invention reside in the novel combination and arrangement of parts and in the details of construction hereinafter illustrated and/or described.

In the drawings:

Fig. 1 is a plan view of a portion of a doughnut machine illustrating an embodiment of my invention applied thereto.

Fig. 2 is an elevational sectional view taken on line 2—2 of Fig. 1.

Fig. 3 is a cross sectional view taken on line 3—3 of Fig. 2 and drawn to a larger scale.

Fig. 4 is a view similar to Fig. 1 of a modification of the invention.

Fig. 5 is an elevational sectional view taken on line 5—5 of Fig. 4.

Fig. 6 is a view similar to Fig. 5 showing the parts in altered position.

Fig. 7 is a cross sectional view taken on line 7—7 of Fig. 5 and drawn to a larger scale.

Fig. 8 is an elevational sectional view taken on line 8—8 of Fig. 7.

Fig. 9 is a plan view similar to Fig. 1 illustrating still another form of the invention.

Fig. 10 is a longitudinal elevational sectional view taken on line 10—10 of Fig. 9.

Fig. 11 is a cross sectional view taken on line 11—11 of Fig. 10 and drawn to a larger scale.

Fig. 12 is a fragmentary elevational view taken on line 12—12 of Fig. 11.

In the application for patent of Peter J. Toews, above referred to, a doughnut machine is disclosed in which the doughnuts are deposited in a cooking liquid contained in a pan or receptacle providing a way along which the doughnuts may travel and in which the doughnuts are progressed through propulsion of cooking liquid. In this way are disposed a turner and an ejector both of the continuous type which are adapted to turn or eject the doughnuts any time the doughnuts reach the same. With such device it becomes necessary to provide some means for controlling the rate of travel of the doughnuts to the turner or ejector which, in the application for patent of Peter J. Toews, referred to, consisted of a pair of alternately movable gates. The present invention is of the nature of said gates and may be used in substitution thereof.

Inasmuch as the construction of doughnut machines with which my invention may be used is well known in the art, a complete doughnut machine has not been illustrated in this application and only so much of the doughnut machine as is necessary to describe the present invention has been shown.

In the drawings a portion of a doughnut machine A has been illustrated which consists of a pan 10 having a way 11 in the same. This pan contains the cooking liquid the level of which is indicated by the reference numeral 12 in Fig. 2. The cooking liquid travels in the direction of the arrow as shown in Fig. 2 and causes the progression of doughnuts along the way, the doughnuts floating upon the surface of the cooking liquid. The pan 10 is constructed with side walls 13 and 14 and a bottom 15 connected therewith.

The invention proper comprises an engaging member 16 which is constructed in the form of a rod or plunger preferably cylindrical and of a length somewhat greater than the thickness of the doughnuts. The end 17 of this plunger is rounded and the said engaging member or plunger is disposed so as to occupy a position in the corner formed between two juxtaposed doughnuts as shown in Fig. 1. The plunger 16 is attached to a link or supporting member 18 which is pivoted by means of rivets 19 to two arms 21 and 22. Arm 21 is secured to a spur pinion 23 which is rotatably mounted on a stud 24 secured to a support 25. Arm 22 is similarly attached to a spur pinion 26 which is rotatably mounted on a stud 27, also secured to the support 25.

The support 25 consists of a plate 28 which is constructed at its lower end with a base 29. Base 29 rests upon a flange 31 issuing outwardly from the wall 13 of the pan 19. The support 25 is secured to the said wall by means of screws 32 which pass through the base 29 and are threaded into the flange 31. Intermediate the two studs 24 and 27 is formed on the plate 28 a bearing 33. This bearing has journaled in it a shaft 34 which has rigidly secured to it a spur gear 35. Gear 35 meshes with the spur pinions 23 and 26 and is considerably larger than the same so that a slight rotation of shaft 34 will give the necessary movement to the arms 21 and 22. The shaft 34 has secured to it, on the side of the plate 28 opposite the gear 35 an arm 37 which has pivoted to it by means of a pintle 38 a link 39. Link 39 is operated by the transmission of the machine and is adapted to be moved at suitable intervals to procure operation of the control device.

The plunger or engaging member 16 moves upwardly and longitudinally of way 11 from its position shown in full lines in Fig. 2 to its dotted position indicated at 39 in the same figure through an arc of a circle. Due to the length of the arms 21 and 22 the arm 22 passes the stud 24, arm 21 and the gear 35. In order to make the parts clear the pinion 26 is constructed with a hub 41 which extends outwardly therefrom and to which the arm 22 is secured. In this case the stud 27 is considerably longer than the stud 24 journaling the gear 23. Also a spacer sleeve 42 is placed between the arm 21 and link 18 whereby the link 18 clears the stud 24. It will thus be readily seen that the link 18 and plunger 16 may move from the cooking liquid through an arc of a circle above the cooking liquid and back in to the cooking liquid.

The operation of the invention is as follows: For the purpose of illustration I have shown diagrammatically in Fig. 1 three doughnuts 43, 44 and 45. Two of these doughnuts are also shown in altered position at 43a and 44a in both Figs. 1 and 2. Assume that the engaging member 16 is in the position shown in full lines in Fig. 1 and in dotted lines in Fig. 2. Doughnut 45 would then be engaging the engaging member 16 and the doughnuts 43 and 44 in back would be held from movement. If the device be now operated by movement of the arm 37 and link 39 toward the right as viewed in Fig. 2, the link 18 and engaging member 16 would first travel upwardly and then toward the left and back again into the cooking liquid. Throughout such movement the link 18, due to the use of the two arms 21 and 22, would remain always vertical and when reentering the cooking liquid would descend in a vertical direction. The path of movement of the round end 17 of the said engaging member would be in an arc of a circle, the radius of which would be equal to the length of either of the arms 21 or 22 between the axes of the pivotal connections thereof. This radius is such that, if the doughnuts did not travel during such movement, the engaging member would re-enter the cooking liquid in the corner formed between the doughnuts 44 and 45. The movement of the engaging member 16 is made fairly rapidly as compared with the normal rate of travel of the doughnuts and I have found in actual practice the time taken for the doughnuts to gain normal traveling speed is considerably greater than the time required to move the engaging member 16. It is thus possible to bring the engaging member 16 back into the cooking liquid before the doughnut 44 has traveled a distance sufficient to engage the same. After the engaging member is in the position shown in dotted lines in Fig. 1 and full lines in Fig. 2, doughnut 45 flows away from the control device and to the turner or ejector 20 and the doughnuts 43 and 44 move up to the positions shown at 42a and 43a where the doughnut 44 engages the engaging member 16 and arrests the travel of the other doughnuts behind it. As soon as the doughnut 45 has moved out of the way the engaging member 16 is moved back to its original position shown in full lines in Fig. 1 and the doughnuts flow up to it, until doughnut 44 is arrested thereby. The device is now in position to be operated in the same manner to successively release doughnuts, as described.

In Figs. 4 to 8 inclusive I have shown a modification of the invention. In this form of the invention the doughnut engaging member operates principally beneath the level of the cooking liquid and engages the doughnut to be released intermediate the end thereof so as to raise the doughnut and cause the same to slide off the engaging member by gravity prior to the arrival of the following doughnut to its engaged position. This form of the invention has been shown in connection with a doughnut machine similar to that previously described and the description thereof will not be repeated and reference numerals preceded by the digit 1 will be used to designate corresponding parts.

In this form of the invention a support 125 is employed, similar to the support 25, which journals a shaft 134. This shaft carries a spur gear 135 which meshes with two pinions 123 and 126. Pinions 123 and 126 are both positioned beneath the shaft 134 and are rotatably mounted on two studs 124 and 127 secured to the plate 128 of support 125. The two pinions 123 and 126 have rigidly secured to them arms 121 and 122 which, in this form of the invention, are formed curved as illustrated in Fig. 8 and are also offset as designated at 120 so that the said arms may clear each other in the movement of said arms from one extreme position to the other. Operating in conjunction with the arms 121 and 122 is a hanger or supporting member 118 which has pivotally attached to it two bosses 141 and 142. These bosses are threaded to receive screws 151 which pass through slots 152 in the ends of the arms 121 and 122. By means of this construction the hanger 118 is pivoted to the two arms 121 and 122 and may be adjusted with respect to the axes of the studs 124 and 127 so as to cause the said hanger to move through a shorter or longer arc as desired. Secured to the lower end of the hanger 118 is a rod 153 which has secured to it an engaging member 154. The engaging member 154 is constructed in the form of a perforated plate which has a bead 155 at the upper portion of the same encircling a rod 153 which is attached to the hanger 118.

The operation of this form of the invention is as follows: In normal position the engaging member 154 occupies the position shown in Fig. 6 in which the doughnuts 145 and 144 are situated behind the same. When the device is operated the engaging member drops downwardly and beneath the doughnut 145 striking the same upon the under surface thereof, as indicated in Fig. 5 to raise the doughnut and cause the same to slide off from said engaging member and into the current of the cooking liquid at a locality beyond said engaging member. At the same time the engaging member 154 is brought immediately in back of the doughnut 144 arresting the travel of this doughnut and the doughnuts behind the same. Doughnut 145 now travels beyond the device. The engaging member 154 is now moved back to its original position as shown in Fig. 6 and the column of doughnuts behind the same travel up to the said engaging member and become arrested thereby, doughnut 144 now occupying the position originally occupied by doughnut 145 in Fig. 6.

In Figs. 9 to 12 inclusive, still another form of the invention is shown in which the engaging member travels beneath the level of the cooking liquid and is moved into position between the doughnuts thereby avoiding striking the same. This form of the invention has again been shown in conjunction with a doughnut machine similar to that previously described and the description thereof will not be repeated. However, the same reference numerals preceded by the digit 2 will be used to designate corresponding parts. In this form of the invention the shaft 234 extends completely across the way 11 and is supported by both the walls 13 and 14 of the pan 10. For this purpose a support 225 is utilized which has a bearing 233 and also an additional bearing 261 is employed which is secured to the wall 14. Shaft 234 is operated by means of a pinion 262 attached to the end of the same which meshes with a gear segment 263 pivotally mounted on a stud 264 secured to the support 225. This segment is operated by means of a link 265 pivoted to the said gear segment at 266.

Attached to the shaft 234, adjacent the bearings 233 and 261, are two arms 267 and 268 which have bosses 269 formed thereon and through which the shaft 234 extends. These bosses are secured to the shaft by means of set screws 271. At the ends of the arms 267 and 268 are blades 272 which project outwardly from said arms and toward one another. These blades are ovular in cross section as shown in Fig. 10 and of such dimensions as to be movable into the corners between the doughnuts 245, 244 and 243 shown in the drawings. The arms 267 and 268 have beveled edges 273 which prevent the doughnuts from catching on the same and cause the doughnuts to travel through the way 11 without obstruction.

The operation of the invention is as follows: When the arms 267 and 268 are in the position shown in Fig. 9 the doughnut 245 engages the same and its movement and that of the doughnuts in back of it are held from movement. When arms 267 and 268 are swung downwardly and rearwardly to the position shown in Fig. 10 the doughnut 245 is freed and the blades 272 brought up into the vacant spaces between the corners of the doughnuts as shown in Fig. 9. This movement takes place so rapidly that the succeeding doughnuts do not have time to advance sufficiently to interfere with the movement of the blades. The doughnuts 243 and 244 then travel through the current of the cooking liquid to the positions indicated at dotted lines 243a and 244a in which the doughnut 244 now engages the blades 272. The doughnut 245 may now travel away from the device and as soon as the same is clear, the device is operated in the opposite direction to bring the blades 272 back to the positions shown in Fig. 9. In this form of the invention the blades 272 constitute the engaging members which engage the doughnut similar to the member 16 of Fig. 1 and the member 154 of Figs. 5 and 6.

The advantages of my invention are manifest. An extremely simple and practical construction is provided for producing the desired results. A unitary device is employed for engaging the doughnuts which eliminates the use of spaced engaging members positioned at different positions along the course of travel of the doughnuts. With such devices considerable trouble has been encountered due to the fact that doughnuts vary in size and when the doughnuts become too large the engaging members frequently jam and fail to function. With my invention the use of an engaging member movable from one position in the way to another position in the way prevents such jamming. With my invention the engaging member moves out of the position of obstruction in a manner such as to prevent injury to the doughnuts. In one form of my invention the engaging member is at all times moved in parallelism so that the same is in proper position to obstruct the doughnuts when reaching obstructing position.

Changes in the specific form of my invention, as herein disclosed, may be made within the scope of what is claimed without departing from the spirit of my invention.

Having described my invention, what I claim as new and desire to protect by Letters Patent is:

1. In a doughnut machine in which the doughnuts are progressed along a way through the flow of cooking liquid, an engaging member adapted to be moved from one position in the way to another position in the way spaced from the first position in the direction of flow of the cooking liquid to release the doughnuts one at a time for travel along said way.

2. In a doughnut machine in which the doughnuts are progressed along a way through the flow of cooking liquid, an engaging member for engaging the doughnuts to arrest the movement of the same, means for guiding said engaging member for movement from a position engaging a doughnut in the way to a position up stream of its original position in the way and through a path clearing the doughnut held by said engaging member whereby said engaging member is brought into position to obstruct the travel of the following doughnut.

3. In a doughnut machine in which the doughnuts are progressed along a way through the flow of cooking liquid, an engaging member for engaging the doughnuts to arrest the travel of the same, means for guiding said engaging member for movement from a position engaging a doughnut in the way to a position up stream of its original position in the way and through a path clearing the doughnut previously held by said engaging member whereby said engaging member is brought into position to obstruct the travel of the following doughnut, said means further guiding said member for movement back to its original position.

4. In a doughnut machine in which the doughnuts are progressed along a way through the flow of cooking fluid, a pivoted arm, an engaging member carried by said arm and movable therewith from one position in the course of travel of the doughnut along the way to another position in the course of travel of the doughnut along the way to successively obstruct the travel of first one doughnut and thereafter the succeeding doughnut in the way thereby releasing the doughnuts one at a time.

5. In a doughnut machine in which the doughnuts are progressed along a way through the flow of cooking liquid, a shaft extending transversely of said way and disposed in proximity to the level of the cooking liquid, an arm carried by said shaft, an engaging member carried by said arm and adapted to be swung with said arm from one to the other of two positions in said way disposed in spaced relation with respect to the direction of travel of the doughnuts in the way and driving means connected to said shaft.

6. In a doughnut machine in which the doughnuts are progressed along a way through the flow of cooking liquid, a shaft extending transversely of said way and disposed in proximity to the level of the cooking liquid, an arm carried by said shaft, an engaging member carried by said arm and adapted to be swung with said arm from one to the other of two positions in said way disposed in spaced relation with respect to the direction of travel of the doughnuts in the way, driving means connected to said shaft said driving means operating to move the engaging member throughout a portion of the travel thereof through the cooking liquid and beneath the doughnut arrested by said engaging member.

7. In a doughnut machine in which the doughnuts are progressed along a way through the flow of cooking liquid, a support, two arms pivotally connected to said support, an operating member, transmission means between said operating member and arms for causing said arms to travel in parallelism and an engaging member carried by said arms and moved from one position to another in said way.

8. In a doughnut machine in which the doughnuts are progressed along a way through the flow of cooking liquid, a support, a gear rotatably mounted on said support, two pinions rotatably mounted on said support and meshing with said gear, arms movable with said pinions, and an engaging member carried by said arms and movable in parallelism thereby from one position to another in the direction of travel of the cooking liquid in said way.

9. In a doughnut machine in which the doughnuts are progressed along a way through the flow of cooking liquid, a support, a gear rotatably mounted on said support, two pinions rotatably mounted on said support and meshing with said gear, arms movable with said pinions, a supporting member pivoted to said arms, an engaging member attached to said supporting member and movable from one position to another in the direction of the travel of the cooking liquid in said way.

ALEXANDER S. T. LAGAARD.